UNITED STATES PATENT OFFICE.

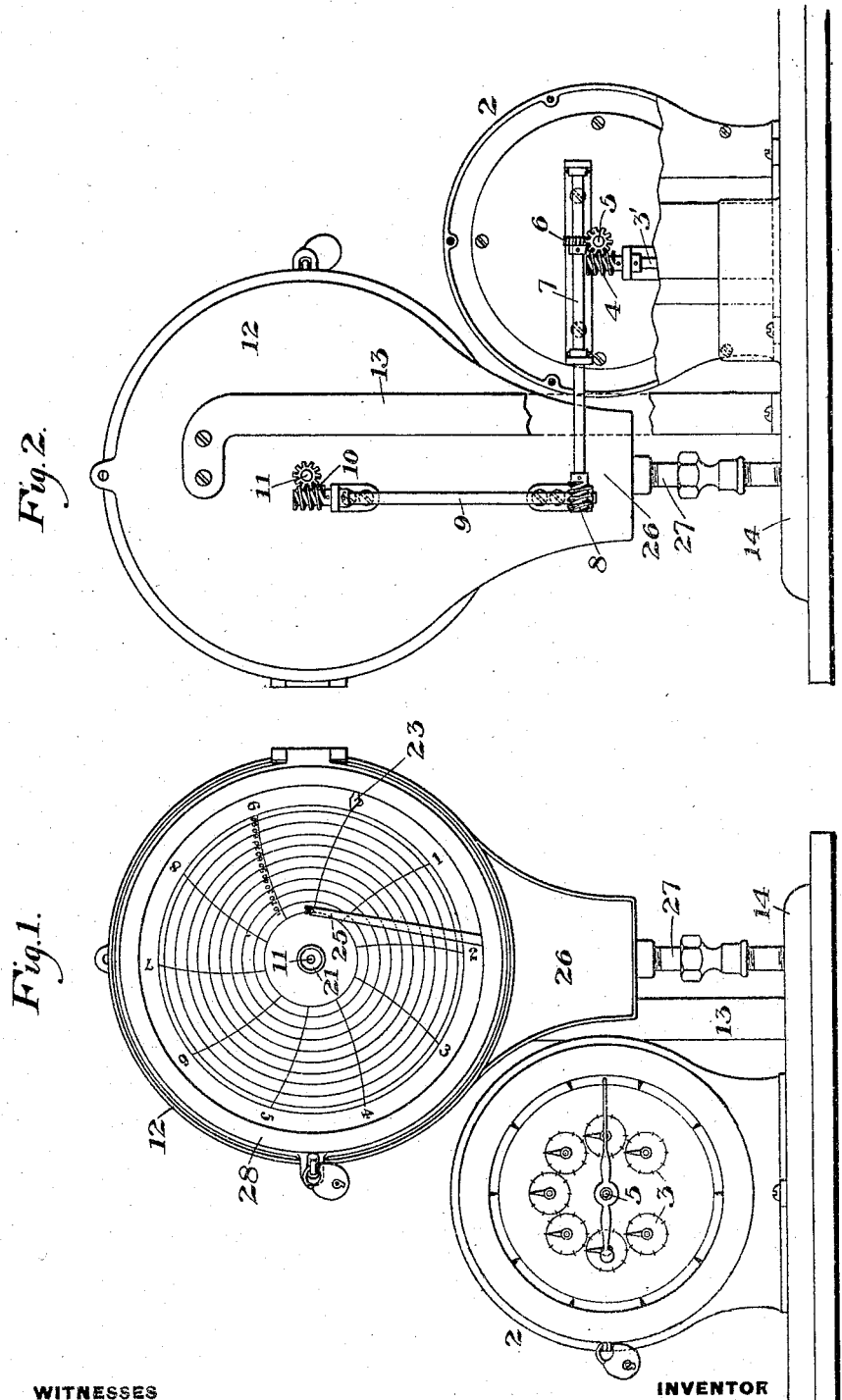

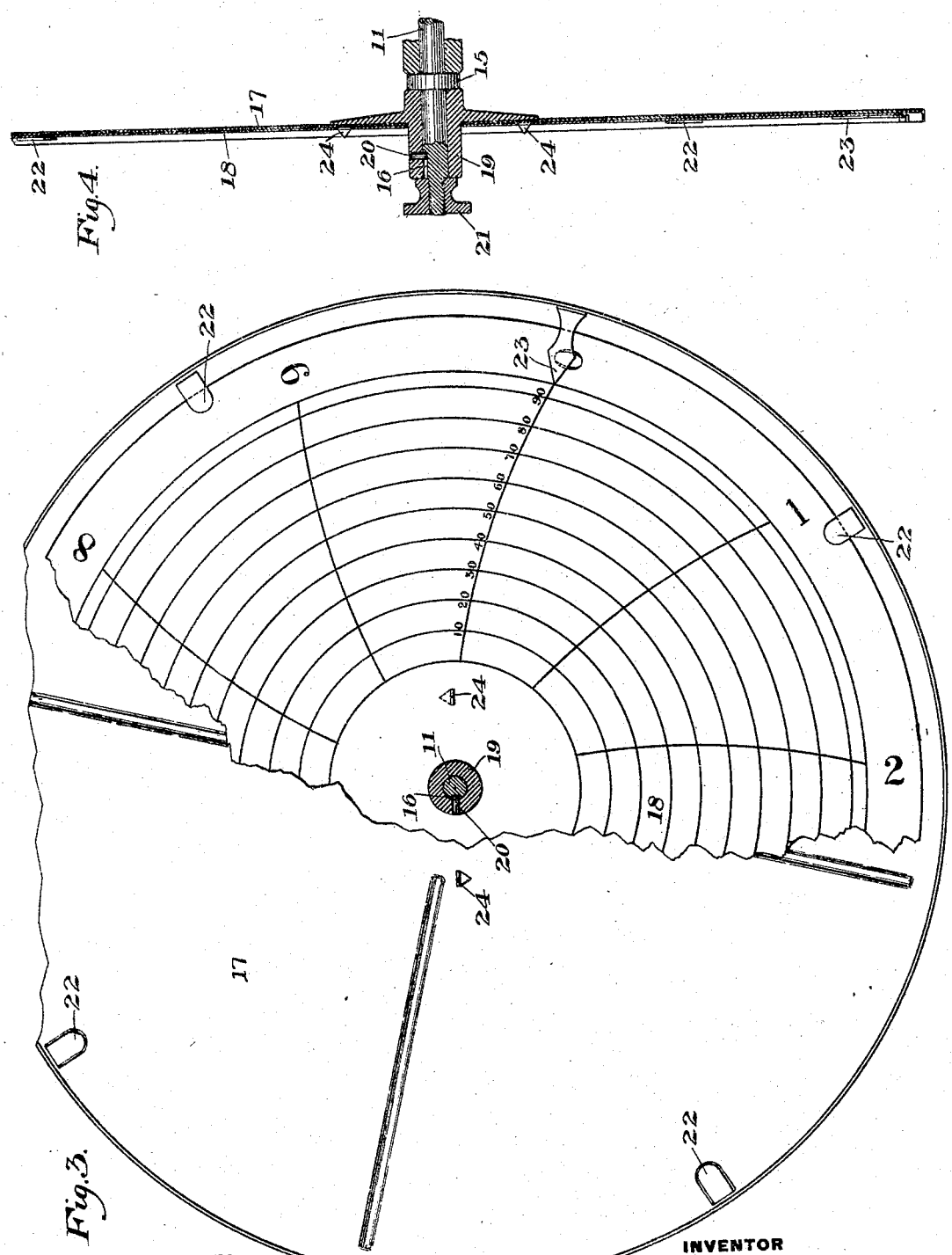

THOMAS B. WYLIE, OF HAYSVILLE, PENNSYLVANIA.

VOLUME AND PRESSURE REGISTER FOR FLUIDS.

No. 796,620. Specification of Letters Patent. Patented Aug. 8, 1905.

Application filed February 11, 1903. Serial No. 142,986.

*To all whom it may concern:*

Be it known that I, THOMAS B. WYLIE, of Haysville, Allegheny county, Pennsylvania, have invented a new and useful Volume and Pressure Recorder for Fluids, of which the following is a full, clear, and exact description, reference being had to the accompanying drawings, forming part of this specification, in which—

Figure 1 is a front elevation showing a gas-meter provided with my improved recorder. Fig. 2 is a rear elevation of the same, partly in section. Fig. 3 is a front elevation of the removable face-plate, showing a portion of the paper disk; and Fig. 4 is a central cross-section of the dial and disk.

My invention relates to the recording of both the pressure and volume of fluid passing through a pipe or conduit, and is designed to provide an automatic recorder which may be cheaply made and applied in connection with an ordinary meter and which will combine a record of the pressure with that of the volume of fluid passing for a given time in such a way as to make the number of feet easily calculable.

In the drawings, 2 represents an ordinary gas-meter, having the usual set of dials 3 for registering the flow. The mechanism of this meter may be of the ordinary type, being driven by the flow of gas therethrough. I have shown the vertical actuating-shaft 3', which leads upwardly from the driving mechanism actuated by the flow and which has worm-gear connection 4 with the horizontal shaft 5, which actuates the meter-pointers. The shaft 5 also carries the worm engaging the worm-wheel 6 upon a shaft 7, which extends to one side of the meter 2 and has worm-gear connections 8 with a vertical shaft 9, having similar gear connection 10 with a dial-shaft 11.

The dial-shaft 11 extends horizontally through the central back portion of a circular case 12, which may be carried upon a suitable standard 13, secured to the base-plate 14 of the meter. The shaft 11 is provided with an enlarged portion 15 and in its intermediate portion has a longitudinal groove 16 along one side.

The dial-plate 17, which carries the removable paper disk 18, is provided with a hub 19, having an inwardly-projecting pin 20, which engages the groove in the dial-shaft in one position, thus allowing the hub to be slipped into place, where it is secured by a nut 21, screwed on the reduced stem of the shaft. The dial-plate is provided with edge-clips 22 and with a pointer 23, which indicates or points to the zero-mark on the chart or paper disk. The dial is also preferably provided with sharp prongs 24, which pierce the paper and hold it firmly against turning.

The removable paper disk is provided with a series of concentric circles, which are pressure-lines, numbers being applied to certain of these lines to indicate the different pressures registered by the pointer 25. The curved radial lines indicate the volume in feet, there preferably being ten main lines spaced equally apart and numbered from "1" to "10," the space between each two of these lines being subdivided by ten similar lines. The chart shown is arranged to register a million feet at each revolution, the space between each radial line being one hundred thousand feet.

The pointer 25 forms a part of an ordinary recording pressure-gage known as the "Bristol" gage. The actuating portion of this gage is within the lower case 26 and is actuated by the pressure of the fluid being measured, which is led thereinto by the pipe 27. This form of gage consists of a flattened spirally-wound pipe-section which is closed at one end and open to the pressure at the other end. The varying pressures tend to coil or uncoil the spiral section, and thus moves the pointer toward or from the center of the chart. The particular form of this gage is immaterial.

The radial lines on the chart are curved to correspond to the curved line on which the pointer-pen moves as it is forced outwardly under increasing pressure.

The case 12 may be provided with a suitable closing-door 28. The pointer 25 is supplied in any desirable way with a pencil or inking-point.

In the use of the device the paper disk or chart is placed upon the dial with the zero-point at the pointer, and the dial-plate is then secured to the shaft in its fixed position relative thereto. As the meter is driven by the flow of gas the connecting-gearing will rotate the dial-plate, while at the same time the pointer will indicate the varying pressures as the chart rotates. The chart may be removed after one revolution or part of a revolution or may remain during several revolutions of the dial. When removed, the next chart being applied in the same way to the pointer at the zero-point, the pointer will start on this chart where it left off on the previous one, thus giving a continuous record.

When the chart is removed, the pressure is averaged for the number of feet recorded, and a multiple corresponding to this pressure is used to multiply the number of feet registered, thus giving the actual number of feet of fluid passing at a determined basis, such as four ounces.

The advantages of my invention result from the simplicity of the device and the ease of operating. The device may be cheaply made, and its manner of use is easily understood.

The pressure and volume recording device may be provided with any suitable gage for actuating the pointer and may be driven by any connections actuated by the current of fluid being measured and many changes may be made in the form and arrangement of the parts without departing from my invention.

I claim—

1. A combined volume and pressure recording device arranged to receive a volume and pressure recording chart, mechanism for continuously recording the pressure and volume on said chart whenever volume is passing under pressure, and means actuated by the volume together with means actuated by the pressure, both controlling the record and cooperating with each other; substantially as described.

2. A recording device having a circular disk, connections for driving the disk actuated by the flow of fluid, and a pointer coacting with the disk and actuated by the pressure of the fluid being measured; substantially as described.

3. The combination with the meter of a volume and pressure recorder having a chart which is moved by connections with the meter, and a pointer actuated by the pressure of the fluid being measured; substantially as described.

4. A volume and pressure recording device having a rotary shaft with connections arranged to be actuated by the flow of the fluid, a dial-plate arranged to engage the shaft in a fixed relation thereto, and a pointer arranged to be actuated by the pressure of the fluid and coacting with the dial; substantially as described.

5. A volume and pressure recorder comprising a rotary shaft having connections arranged to be actuated by the flow of fluid being measured, a removable dial-plate on the shaft, a removable chart on the plate having circled and radially-extending lines, and a pointer arranged to be moved in a radial direction over the chart by the pressure of the fluid being measured; substantially as described.

In testimony whereof I have hereunto set my hand.

THOMAS B. WYLIE.

Witnesses:
  Geo. B. Bleming,
  H. M. Corwin.